United States Patent [19]
Hahn et al.

[11] Patent Number: 5,964,572
[45] Date of Patent: Oct. 12, 1999

[54] VEHICLE RESTRAINT

[75] Inventors: Norbert Hahn, Franklin; Brian Bender, Racine, both of Wis.

[73] Assignee: Rite-Hite Holding Corporation, Milwaukee, Wis.

[21] Appl. No.: 08/999,355

[22] Filed: Dec. 29, 1997

Related U.S. Application Data

[63] Continuation of application No. 08/652,995, May 24, 1996, Pat. No. 5,702,223, which is a continuation of application No. 08/173,411, Dec. 23, 1993, abandoned.

[51] Int. Cl.$^6$ .................................................. B65G 67/02
[52] U.S. Cl. .......................... 414/800; 414/396; 414/584; 414/401; 340/932.2
[58] Field of Search .................................... 414/400, 396, 414/584, 401, 800, 809; 14/69.5, 71.1; 340/932.2, 933

[56] References Cited

U.S. PATENT DOCUMENTS

| | | |
|---|---|---|
| Re. 32,968 | 6/1989 | Hahn . |
| 4,264,259 | 4/1981 | Hipp . |
| 4,373,847 | 2/1983 | Hipp et al. . |
| 4,379,354 | 4/1983 | Hahn et al. . |
| 4,402,100 | 9/1983 | Slusar . |
| 4,443,150 | 4/1984 | Hahn et al. . |
| 4,472,099 | 9/1984 | Hahn et al. ............................. 414/401 |
| 4,488,325 | 12/1984 | Bennett et al. ..................... 414/401 X |
| 4,560,315 | 12/1985 | Hahn . |
| 4,589,813 | 5/1986 | Hagen et al. ........................ 414/396 X |
| 4,630,989 | 12/1986 | Davey . |
| 4,634,334 | 1/1987 | Hahn et al. . |
| 4,664,582 | 5/1987 | Edmeads ................................ 414/401 |
| 4,674,941 | 6/1987 | Hageman . |
| 4,695,216 | 9/1987 | Erlandsson . |
| 4,759,678 | 7/1988 | Hageman ................................ 414/401 |
| 4,767,254 | 8/1988 | Kovach et al. . |
| 4,784,567 | 11/1988 | Hageman et al. . |
| 4,815,918 | 3/1989 | Bennett et al. . |
| 4,830,563 | 5/1989 | Yeakle . |
| 4,861,217 | 8/1989 | Erlandsson . |
| 4,887,954 | 12/1989 | Gregerson et al. . |
| 4,915,568 | 4/1990 | West . |
| 4,938,647 | 7/1990 | Erlandsson . |
| 4,946,330 | 8/1990 | Pedersen et al. ....................... 414/401 |
| 4,963,068 | 10/1990 | Gelder . |
| 4,973,213 | 11/1990 | Erlandsson . |
| 4,988,254 | 1/1991 | Alexander . |
| 5,054,237 | 10/1991 | Kapala et al. . |
| 5,212,846 | 5/1993 | Hahn . |
| 5,297,921 | 3/1994 | Springer et al. ....................... 414/401 |
| 5,388,947 | 2/1995 | Ancel . |

OTHER PUBLICATIONS

Nova Technology Inc.; Nova Technology Truck Lock; Installation Instructions & Owner's Manual; 1986; pp. 1–14.
W.B. McGuire Co., Inc.; TRD–2000 Truck Restraint Device.

*Primary Examiner*—Frank E. Werner
*Attorney, Agent, or Firm*—Marshall, O'Toole, Gerstein, Murray & Borun

[57] ABSTRACT

Vehicle restraint including a support mounted adjacent a loading structure. A carriage is supported from the support and has a generally horizontal portion extending over the roadway, the horizontal portion being operatively engageable with the vehicle bar over a vertical range. A vertically elongate barrier is supported from the carriage and is disposed remotely from the upright loading structure, the barrier being mounted for generally vertical movement with respect to the carriage between an inoperative vehicle-released position wherein the barrier is disclosed below the horizontal portion, and an inoperative vehicle restraining position, wherein the barrier extends vertically a fixed distance above the horizontal portion to define a vehicle bar capture distance along the horizontal portion.

5 Claims, 7 Drawing Sheets

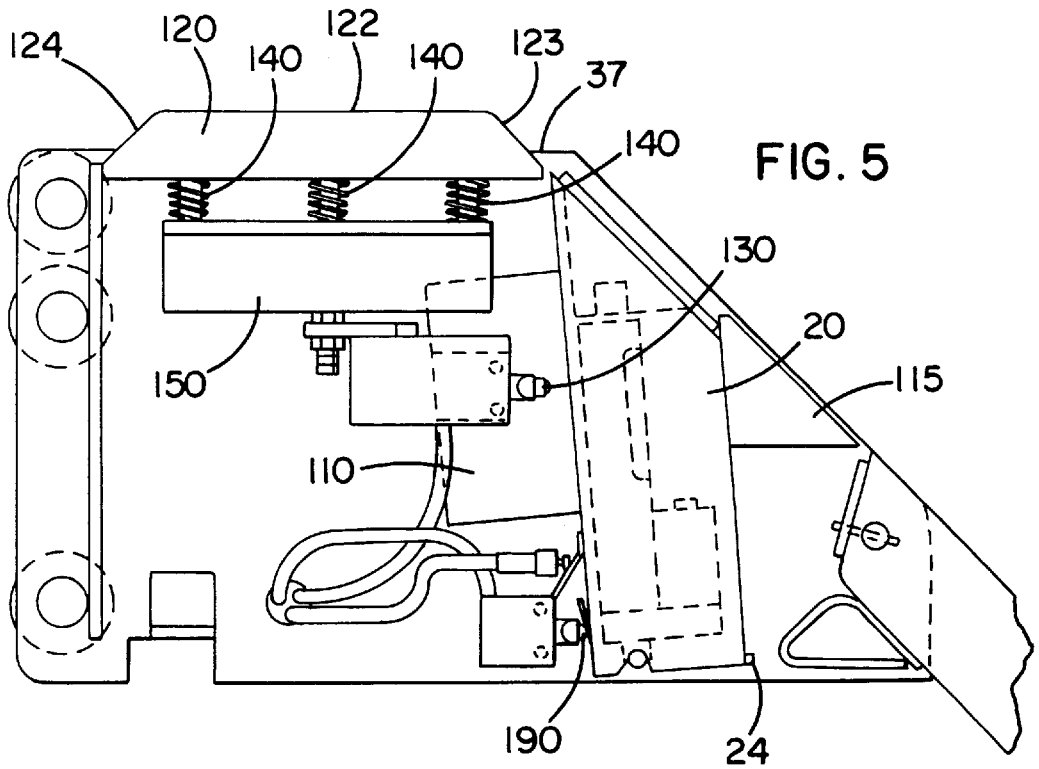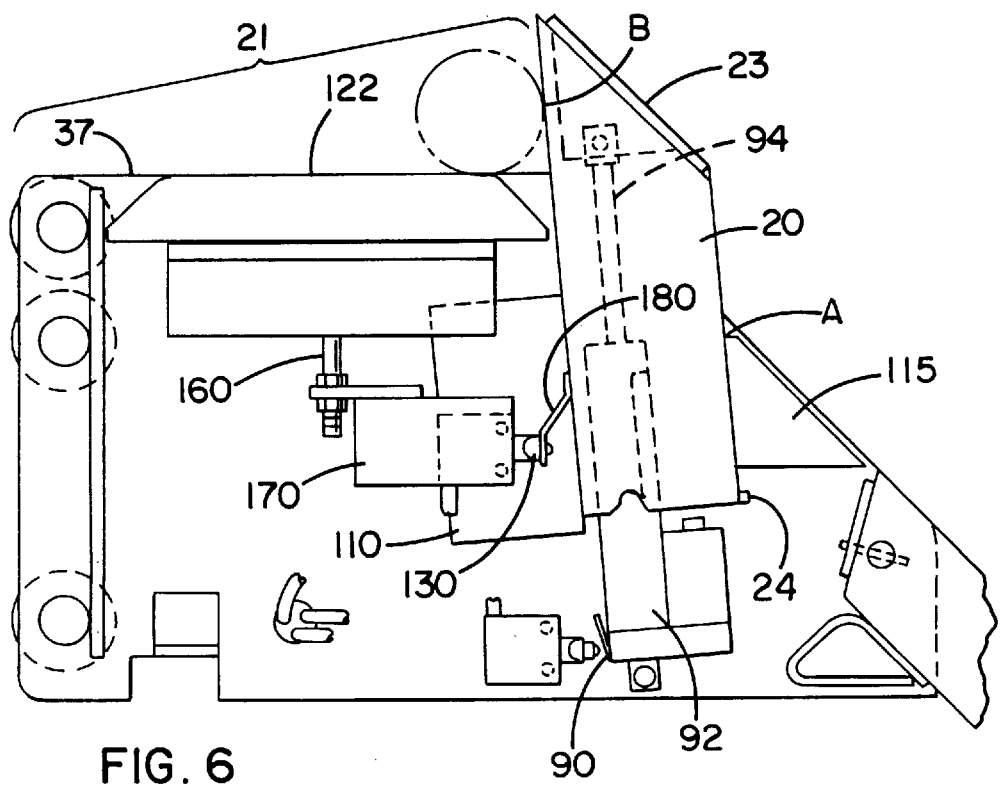

VEHICLE RESTRAINT

This application is a continuation of U.S. application Ser. No. 08/652,995, filed on May 24, 1996, now U.S. Pat. No. 5,702,223, which is a continuation of U.S. application Ser. No. 08/173,411, filed on Dec. 23, 1993, now abandoned.

BACKGROUND OF THE INVENTION

1. Field of the Invention

This invention relates generally to safety equipment for use in conjunction with a loading dock, and specifically to a vehicle restraint to prevent accidental or unauthorized moving of a parked vehicle away from the dock while the vehicle is being loaded or unloaded.

2. Description of the Prior Art

Proper securing of a parked vehicle to a loading dock during loading or unloading is an essential safety precaution. When a securement system is not in place, the vehicle may accidentally or inadvertently be moved away from the dock. This in turn may result in serious injury to the dock personnel, as well as product damage or loss of the cargo being moved.

To prevent a parked vehicle from moving during such loading and unloading operations, a variety of vehicle restraints have previously been employed. In general, such restraints are mounted to the face of the loading dock, or the driveway approaching it, and include a hook or other retaining member which has a generally horizontally extending leg and a vertical projection and which restrains a vehicle bar suspended from the rear end of the parked vehicle. Typically, the vehicle restraint engages a horizontally disposed bar suspended from the rear of the vehicle as mandated by ICC regulations. Such a vehicle bar will be referred to herein as an ICC bar. An example of a vehicle restraint engaging a vehicle bar in the form of an ICC bar can be seen in U.S. Pat. No. 4,443,150 to Hahn, et al. the disclosure of which is incorporated herein by reference. In that type of vehicle restraint, the hook is carried within a vertically movable carriage. The carriage is biased upwardly and includes a sloping cam surface, which is engaged by the ICC bar as the truck backs into position to push the carriage downward from its elevated rest position. When the truck is fully backed in, the ICC bar is in engagement with a top surface of the carriage. The hook including the leg and vertical projection is then moved as a unit vertically from its rest position inside the carriage to its vehicle-engaging position wherein the ICC bar is captured behind the vertical projection of the hook.

Certain other restraints have used a pivotal hook movement wherein the retaining hook rotates from a stored position to a vehicle-engaging position such as in U.S. Pat. No. 4,264,259 to Hipp. That restraint has a movable carriage similar to that of the '150 patent, but the hook is pivotally mounted within the carriage. Pivotal movement of the hook places the vertical projection in a position where it can capture an ICC bar of a properly parked vehicle. The vehicle restraint of U.S. Pat. No. 4,759,678 to Hageman also shows pivotal movement of a hook housed within a carriage.

The types of restraints just described have used both manual and power-driven means for moving the hook. The '150 patent shows manual vertical movement of the entire hook, including the horizontal leg and the vertical projection. The '259 and '678 restraints both show pivotal movement of the hook by power-driven means which are external to the carriage. A further U.S. Pat. No. 4,472,099 to Hahn, shows a pivoting hook and a power-driven means housed within the carriage.

When the powered drive is external to the carriage, it may be subject to damage from the truck itself, or other external forces. Housing the powered drive in the carriage allows for protection from outside elements, but makes it susceptible to damage from uncontrolled movement of the hook or carriage. Further, housing of the powered drive for a horizontally-extending hook in the carriage limits the size of the drive since the hook itself requires space within the carriage—both for housing the hook and for allowing it unimpeded travel. As a result, the powered drive has less output capacity, and less ability to withstand excessive forces from uncontrolled movement of the hook or carriage, or from an attempt to move the vehicle while restrained. The problem of a low output capacity for the drive may be compounded by the fact that the horizontal leg and vertical projection of the hook make the hook relatively massive. Further still, a mounting of the powered drive in the carriage may require complex power-transfer mechanisms such as bar linkages and the like for moving the hook as in the '099 patent. This is particularly true in the case of a linearly moved horizontally-extending hook, since a vertical force must be applied to a member having a significant horizontal extent.

In the situation where the hook is moved manually, a significant force must be applied to move the hook including the relatively massive horizontal leg and vertical projection to its elevated vehicle-restraining position. Further, some means, such as a latch or other engaging mechanism, must be employed to maintain the entire hook including the horizontal leg and vertical projection in the elevated position. Thus, while these devices are effective in restraining a parked vehicle, they have certain shortcomings.

SUMMARY OF THE INVENTION

It is thus a primary aim of the present invention to provide a vehicle restraint which minimizes the previously mentioned shortcomings present in prior devices of this type.

In accordance with that aim, it is an object of the present invention to provide a vehicle restraint, including an independently movable carriage, and employing a simplified vehicle restraining member that is housed within the carriage.

It is a further object to provide a vehicle restraint in which the powered drive for moving the vehicle restraining member is simple in construction and does not occupy an undue amount of space inside the carriage.

It is a related object to provide a vehicle restraint in which a complex power-transfer means from the powered drive to the vehicle restraining member is not employed.

It is also an object of the invention to provide a vehicle restraint in which the powered drive is less susceptible to damage from uncontrolled carriage movement, or from a force exerted on the vehicle restraining member from efforts to move a restrained vehicle.

It is a feature of the present invention that the vehicle restraining member is a vertical barrier, without an extended horizontal projection, that reciprocates vertically between an inoperative position inside the carriage and a vehicle-restraining position.

It is also a feature of the invention that the powered drive is housed within the vehicle restraining member when that member is in the inoperative position.

It is a further feature that the powered drive is releasably coupled to the vertical barrier such that the vertical barrier can move independently of the drive.

It is a further feature of the invention that the vehicle restraint includes signalling mechanisms for improving the safety of the vehicle restraint and the loading dock environment and cooperative means providing an integrated system of sensing and controlling the carriage, restraining device and operational information devices.

In accordance with these and other objects and features of the invention, there is provided a vehicle restraint for securing a vehicle parked on a roadway relative to an adjacent structure. The vehicle restraint includes a support mounted on or to the face of the adjacent structure directly or indirectly. A carriage is mounted to the support for substantially vertical movement with respect thereto. At least one spring or bias device is connected between the support and the carriage for biasing the carriage to yieldably assume an elevated position. The carriage is movable downwardly from the elevated position upon an external force of a sufficient magnitude being exerted on the carriage. The vehicle restraint also includes a vertically elongate barrier mounted within the carriage for substantially vertical movement with respect to the carriage between an inoperative vehicle-release position wherein the barrier is disposed within the carriage, and an operative vehicle-restraining position wherein the barrier extends vertically above a horizontal top surface of the carriage. To effect movement of the vertical barrier between the inoperative and the operative position, a driver is also provided. The driver may either be powered or some form of non-powered means such as a spring or other bias mechanism.

According to a preferred embodiment of the invention, the carriage includes two side plates having a front section that includes an upwardly and rearwardly extending cam surface, which is engaged by the ICC bar of an entering vehicle to exert a downward force on the carriage. The top surface of the vertically moveable barrier has a similar sloping surface that is disposed between and just below the side section camming surfaces when the vertical barrier is in the-inoperative position. One embodiment of the vehicle restraint also includes a sensor member that is biased to extend above the horizontal top surface of the two side plates. A properly positioned ICC bar presses down on the sensor to make its top surface flush with the top surface of the side plates. As a result, a contact switch attached to the sensor assumes an operative position. That position can be utilized to actuate audio or visual devices providing operational information or warnings. Also, in the operative position a switch-engaging member on the vertical barrier depresses the switch when the barrier assumes its fully extended position. The closing of the switch with the ICC bar depressing the sensor and the vertical barrier fully extended serves as an indication that the vehicle is being restrained by the vehicle restraint. Ultimately, this closing of the contact switch may serve as a control for limiting the upward travel of the vertically travelling barrier.

According to an alternative embodiment, a manual version of the vehicle restraint is provided. A spring or other biasing mechanism is housed within the vertical barrier and serves to move the barrier toward the operative position. A latching mechanism secures the vertical barrier in the inoperative position. Release of the latch allows the barrier to rise to its operative position. To return the vertical barrier to the inoperative position, a manually-actuated latch is provided. The manually operated vehicle restraint may or may not include the sensor, but in any event may also include advantageous signalling and safety features.

BRIEF DESCRIPTION OF THE DRAWINGS

FIG. 5 is a sectional view of the vehicle restraint according to the invention in the inoperative position;

FIG. 6 is a sectional view of the vehicle restraint according to the invention in the operative position;

DETAILED DESCRIPTION OF THE PREFERRED EMBODIMENT

Figure 1:
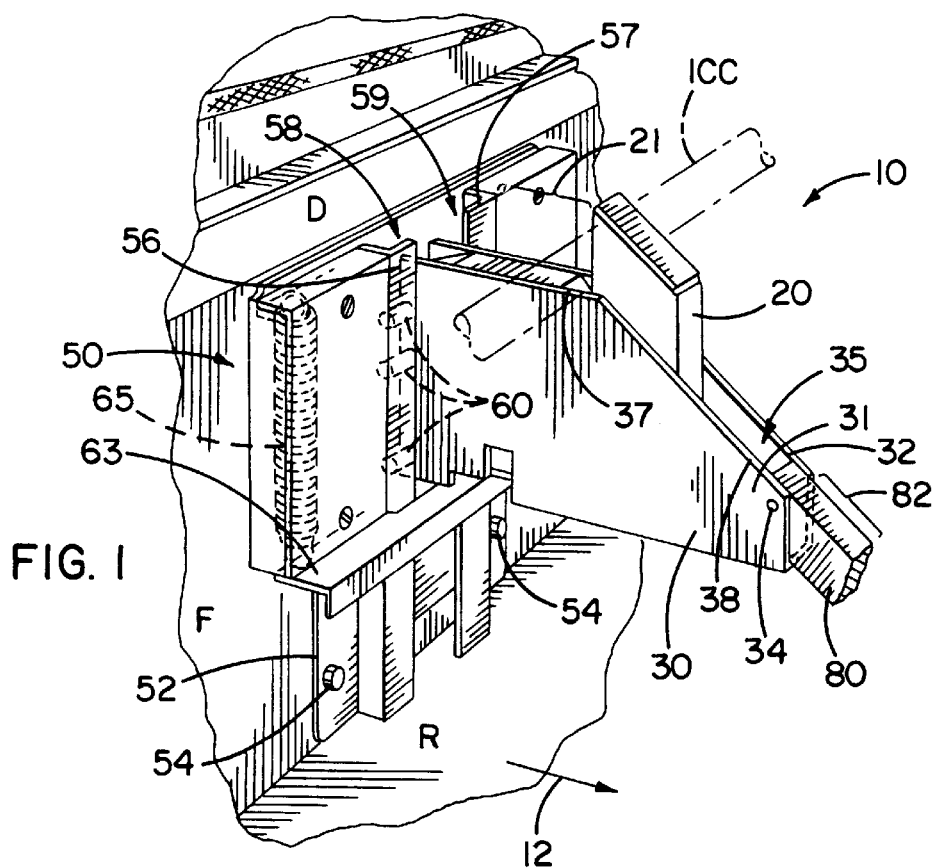
FIG. 1 is a perspective view of a vehicle restraint according to the present invention.

The invention relates to an improved vehicle restraint for securing a vehicle parked on a roadway adjacent a loading structure, and one embodiment of the present invention is shown in FIG. 1. The vehicle restraint 10 is mounted on or adjacent to the front face F of a loading dock D. A roadway R extends away from the face F of the dock. The vehicle restraint 10 is adapted to capture a vehicle bar depending from the rear of the vehicle. For the purpose of illustration herein, reference will be made to a vehicle bar in the form of an ICC bar. The vehicle restraint 10, in FIG. 1, captures the ICC bar (shown in phantom) of the parked vehicle which is parked adjacent to the dock D on the roadway R. With the ICC bar retained in this fashion, the vehicle is prevented from pulling from the face of the dock in the direction indicated by the arrow 12. Such restraint of the vehicle not only prevents the vehicle from accidently and inadvertently rolling away from the dock D during unloading and loading, but also prevents the driver from accidentally driving the vehicle away during the same operations. As can be appreciated, movement of the vehicle away from the dock D during unloading or loading operations could be hazardous to any of the dock personnel performing these functions.

As can be seen from FIG. 1, the ICC bar of the parked vehicle is captured behind a barrier 20 extending upwardly from a roughly trapezoidal-shaped housing or carriage 30. The barrier 20, to be discussed in greater detail below, reciprocates vertically relative to the carriage between an operative, vehicle-restraining position of FIG. 1, and an inoperative position where barrier 20 is disposed fully within housing 30. Housing 30 maintains the desired spacing of the vertical barrier 20 away from face F, and also positions the barrier for effective movement between its operative and inoperative positions.

Housing 30 is formed of two side plates 31 and 32 defining spaced planes, and which have the same shape (i.e. are congruent) and are disposed parallel to each other to define a housing interior volume designated generally by reference numeral 35. A variety of other components making up the vehicle restraint, also to be described in greater detail below, are disposed within this interior volume.

To secure the housing 30, and its associated components relative to the face F of the dock, a support 50, having a guide section including channels 58 and 59, is mounted adjacent the loading structure either on or adjacent to the face F of the dock. The support 50 of this embodiment includes a back plate 52 which may illustratively be mounted to the face F of the dock by means of bolts 54. Alternatively, the support 50 could include a back plate attached to a second plate which is fixed to the roadway R instead of to dock face F. In the present embodiment, the guide section also includes a pair of guide brackets 56 and 57 which are mounted to the back plate 52 to form the two vertical channels 58 and 59. The carriage 30 which is mounted for vertical movement on the guide section, includes suitable roller assemblies 60. These horizontally extending roller assemblies 60 are adapted to fit within vertical channels 58 and 59. In this manner, the carriage 30 is mounted for vertical movement on the guide section 50.

The vehicle restraint 10 is shown in its vehicle-restraining or operative mode in FIG. 1. As mentioned, the vehicle restraint 10 also has an inoperative mode wherein the vertical barrier 20 moves generally vertically to a position wherein it is fully disposed within the carriage 30. Movement of the barrier 20 from this inoperative position to the operative position shown in FIG. 1 will only result in capture of the ICC bar if that bar is disposed along the horizontal top surface 37 of the carriage 30 within the capture distance 21, between dock face F and an extended vertical barrier 20. That is, an ICC bar will only be captured by the barrier 20 extending vertically out of carriage 30 if there is proper orientation of the ICC bar with respect to the carriage 30 and the barrier 20 such that the ICC bar is disposed between the barrier 20 and the face F of the dock.

Figure 2:
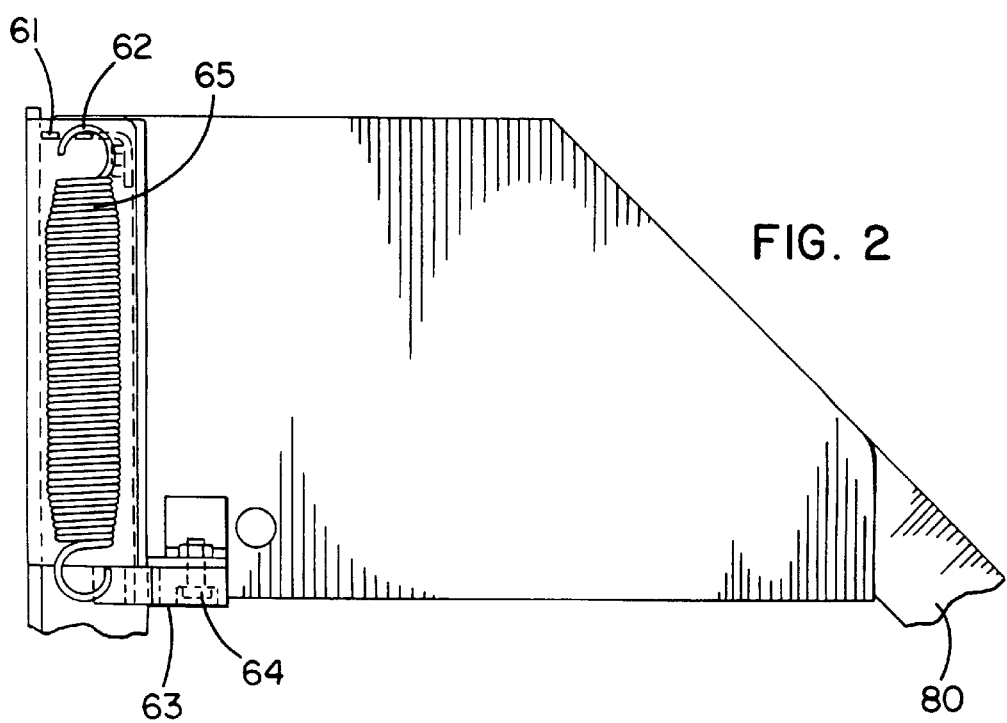
FIG. 2 is a side sectional view of the vehicle restraint according to the invention.

The means by which this proper orientation of the ICC bar and the barrier 20 is achieved will now be described in greater detail. The carriage 30 is biased to yieldably assume an elevated position. To bias the carriage to this elevated position, a bias device illustratively in the form of a spring 65 is operatively connected to the guide section 50 and to the carriage 30. (See FIG. 2). As can be seen from FIG. 2, the springs 65 are mounted on either side of brackets 56 and 57, shown in FIG. 1. A spring mounting bracket 61 is stationary and fixed to the back plate 50, and includes a receiving hole 62 for receiving an upper projection from spring 65. A lower projection from spring 65 is mounted to a spring anchor 63, which is in turn fixed to carriage 30. Spring anchor 63 extends outwardly from sidewalls 31, 32, and is fixed to carriage 30 by bolts 64. Although only one spring 65 has been mentioned, several springs could comprise the bias device. Moreover, a variety of configurations of spring anchor 63 could be used, so long as they are fixed to the carriage 30 and are adapted for receiving an end of a spring, springs, or other biasing device. Moreover, although extension springs are shown, compression springs, gas springs, or other bias devices, could be mounted below the carriage and used for upward biasing of the carriage.

The carriage 30 is biased to an elevated position, usually several inches higher than the range of ICC bars. The backing in of a vehicle, and engagement of its ICC bar with the restraint will cause the carriage 30 to move downward to a position such that the proper orientation of the ICC bar and the vertically-extending barrier 20 can be achieved. Toward that end, carriage 30 includes an upwardly and rearwardly sloping cam surface 38. When the ICC bar of a parking vehicle engages the camming surface 38, the carriage 30 will be forced downwardly as the magnitude of the downward force exerted by the ICC bar on the camming surface overcomes the effect of the spring 65. The stiffness of the spring 65 is selected such that contact of an ICC bar of a parking vehicle will overcome the bias of the spring 65 without causing damage to the building, restraining device, or ICC bar. As the vehicle continues to back into position, the carriage continues to ride down with the cam surface 38 remaining in contact with the ICC bar, thus further lowering the carriage 30. As the vehicle approaches the dock face, the ICC bar engages the horizontal surface 37 to properly position the horizontal surface relative to the ICC bar, and to limit upward movement of carriage 30. With the ICC bar adjacent the horizontal surface, the orientation of the ICC bar is now such that the ICC bar is within a capture distance 21 which is defined by the horizontal separation of barrier 20 at the distal end of the carriage from face F. The vertical barrier 20 can now be moved to its operative position shown in FIG. 1 and capture the ICC bar between the barrier 20 and face F to restrain the vehicle.

According to this arrangement, the relative vertical position of the horizontal surface 37 and barrier 20 is controlled by the height of the ICC bar above the roadway. As long as the ICC bar is within the vertical range of movement of the carriage 30, the carriage 30 can move so that this configuration is achieved. This in turn leads to one of the advantageous features of the present invention.

To allow the vehicle restraint 10 to be adaptable to a wide range of heights of ICC bars and especially low ICC bars, an elongated toe-like member 80 is pivotally mounted to the front section of the carriage 30 as more fully described in U.S. Pat. No. 4,560,315 and U.S. Reissue Pat. No. 32,968. Since the exact height of an ICC bar is not carefully regulated, they may be at a variety of heights above the roadway. In a vehicle restraint without toe-like member 80, it would be possible for an ICC bar of a vehicle to be low enough to pass beneath the cam surface 38 of the carriage.

The bias device in the form of spring 65 further serves to maintain the capture of the ICC bar during the entire loading and unloading operation. As material is loaded onto a parked vehicle, the added weight of the cargo may cause the vehicle, and thus the ICC bar, to assume a lower position. Conversely, as the truck is unloaded the suspension system on the truck may cause it to assume a higher position due to a lesser cargo weight. The magnitude of this change depends upon the particular truck suspension. Such movement of a parked vehicle during loading and unloading is generally referred to as "float" of the vehicle. The action of the bias device 65 in the vehicle restraint 10 allows the restraint to accommodate such vehicle float. Since the carriage 30 is biased upwardly by the bias member 65, any upward float of the truck due to unloading will result in the carriage also moving upward under bias from the bias member 65 so that the ICC bar maintains contact with the horizontal surface 37 of the carriage. Thus, the vertical relationship of the barrier 20 to the ICC bar will remain unchanged. Similarly, as the vehicle and its attached ICC bar move downwardly due to loading, the upward force of the bias member 65 is overcome and the carriage 30 is pushed downwardly. By means of the bias device, then, the I.C.C. bar always maintains contact with the horizontal surface 37 and thus remains captured along the horizontal surface 37 of the carriage and behind the barrier 20 when it is in its extended position.

Thus far, various structures of vehicle restraint 10 have beer described, such structures place and maintain carriage 30 in a position such that movement of the barrier 20 to the operative position will define a restraint envelope for the parked vehicle. Furthermore, the structure of the vehicle restraint which allows the restraint to follow the upward and downward float of a truck during loading and unloading has been described. The operation of the barrier 20 and various other components of vehicle restraint 10 which are housed within the internal volume 35 of the carriage 30 will now be described in greater detail, along with their various functions.

Figure 3:
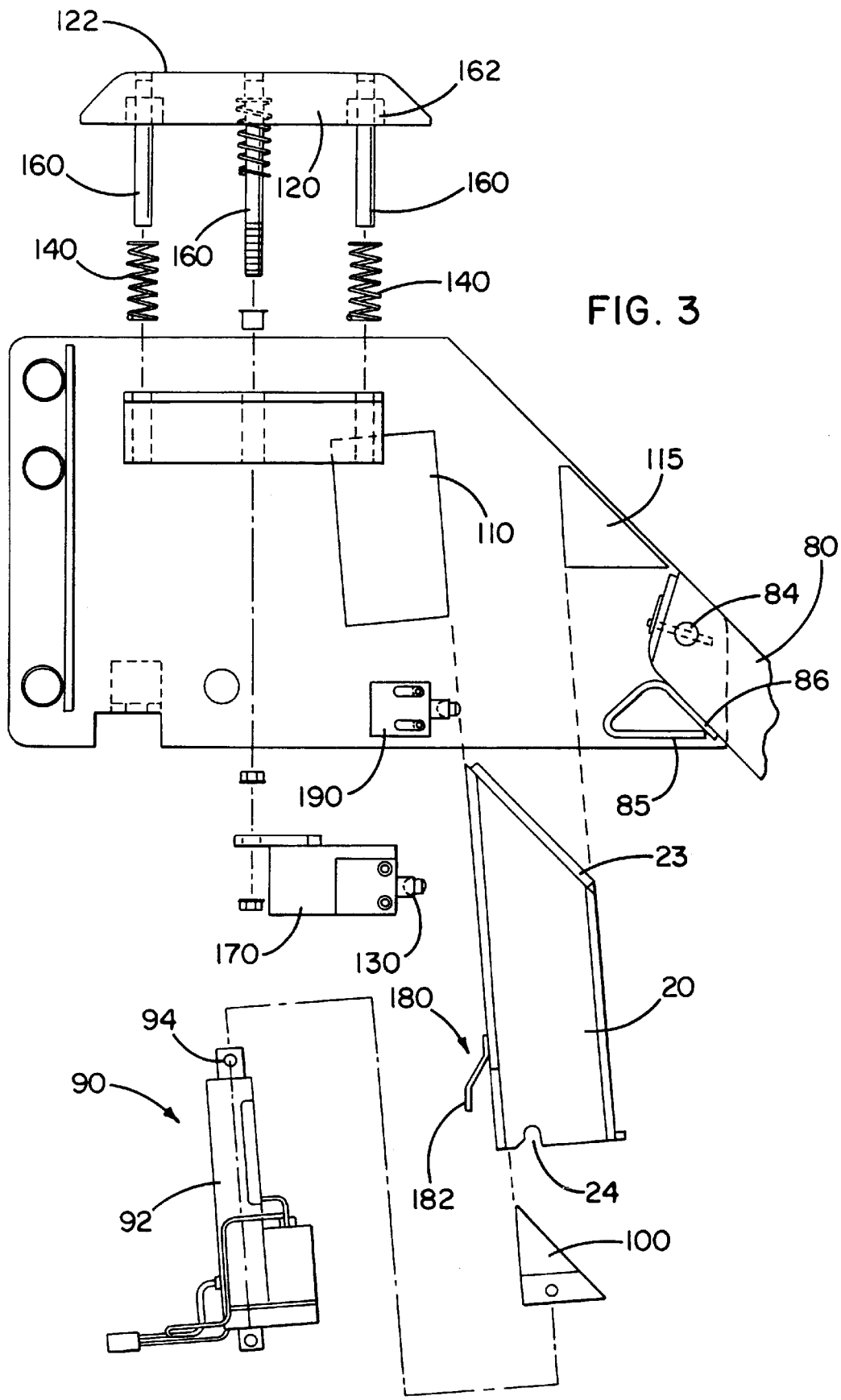
FIG. 3 is an exploded side view of the vehicle restraint according to the invention.
Figure 4:
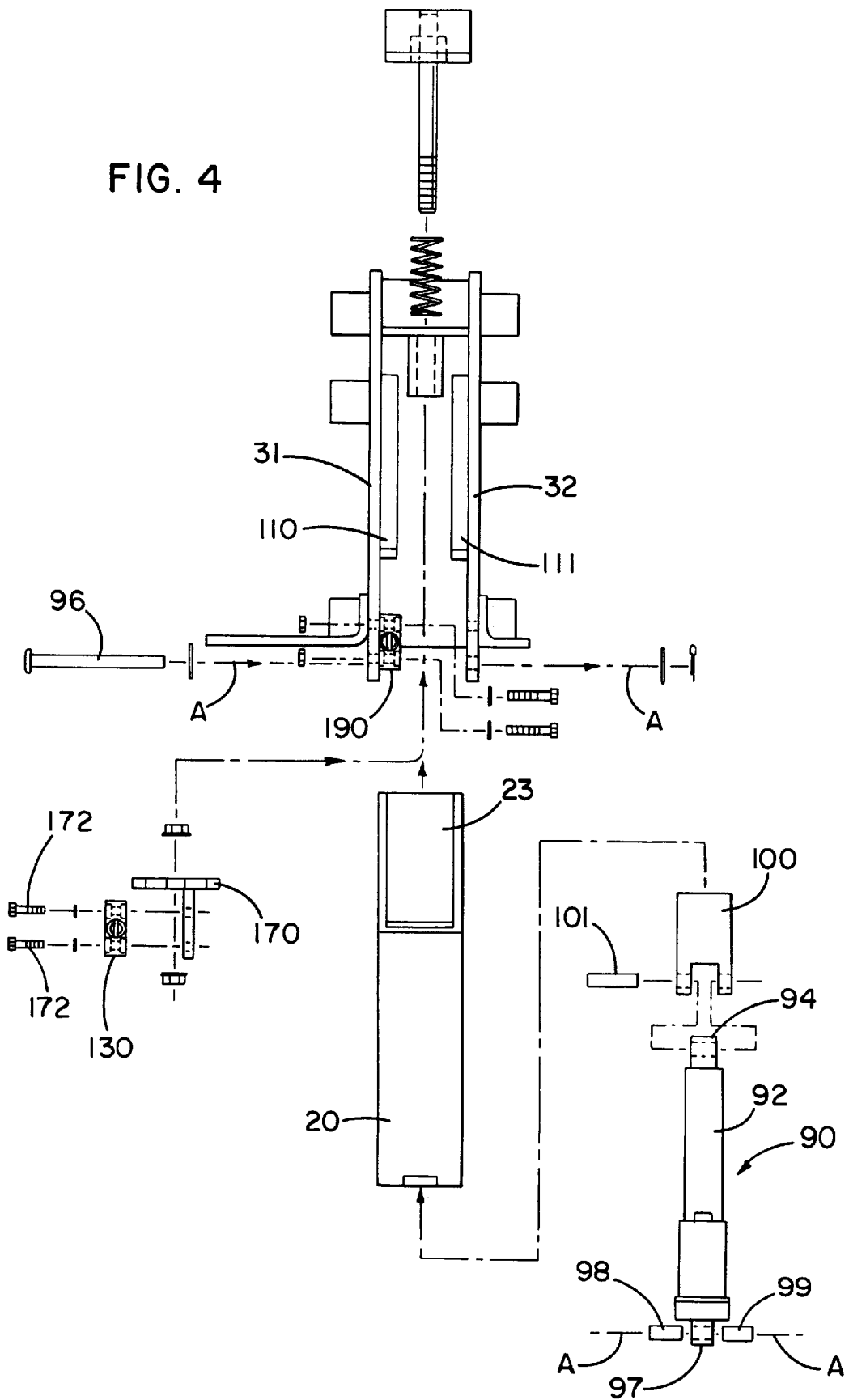
FIG. 4 is an exploded front view of the vehicle restraint according to the invention.

An exploded view of the components of vehicle restraint 10, according to this embodiment of the invention, are shown in FIGS. 3 and 4. The vertically elongate barrier 20 is mounted within the carriage 30 for generally vertical movement with respect to the carriage between an inoperative, vehicle-release position, shown most clearly in FIG. 5, and an operative vehicle-restraining position shown most clearly in FIG. 6. In the inoperative vehicle-release position the barrier is disposed fully within the carriage 30. In the operative, vehicle-restraining position, the barrier extends vertically above the horizontal top surface 37 of the carriage.

The vertical barrier 20 includes two side walls and front and rear walls which define an open interior volume. The vertical barrier 20 also includes a sloping top surface 23 which is parallel to the sloping cam surfaces 38 of the side plates 31 and 32. With the vertical barrier in the inoperative, vehicle-release position the sloping surface 23 of the barrier is disposed between and slightly below the camming surfaces of the side plates. The positioning of this sloping surface 23 slightly below the surface of the camming surfaces 38 of the carriage prevents undue wear of this surface of the barrier by repeated sliding contact with an approaching ICC bar. At the same time, the fact that the sloping surface 23 is parallel to the camming surface 38 allows the vertical barrier to be disposed as close to the exterior of the carriage as possible.

To provide for movement of the vertical barrier between the inoperative an operative positions, a driver 90 is included which is housed within the carriage 30 and also within the open interior volume of vertical barrier 20. According to the present embodiment, the driver 90 is a screw drive which includes an external cylinder 92 and a screw-driven piston 94 which moves in and out of cylinder 92. Piston 94 is shown in its withdrawn position in FIG. 3, and in its extended position in FIG. 6. Driver 90 is mounted within carriage 30 by means of a clevis pin 96, shown most clearly in FIG. 4. As reference letter A in FIG. 4 indicates, clevis pin 96 is fed through a projection 97 on the bottom of driver 90. On either side of the projection 97 and between side walls 31 and 32, there are also included cylindrical sleeves 98 and 99 which fit over this pin 96. These cylindrical collars, along with the clevis pin serve to limit the downward motion of the vertical barrier 20.

As can be seen in FIG. 3, the vertical barrier 20 may include a notch 24 in each of its side walls. As the vertical barrier 20 is lowered from its operative position to its inoperative position, this notch engages the cylindrical collars 98 and 99 disposed on the clevis pin thereby preventing any further downward movement of the vertical barrier 20. Such an arrangement protects the driver 90 from being unduly damaged by a lowering vertical barrier 20. Moreover, this arrangement allows the driver 90 to be fully housed within the interior volume of the vertical barrier 20 when the vertical barrier is in the inoperative position. This aspect can be seen most clearly in FIG. 5. This is advantageous because not only because the driver is protected by being housed within the barrier, but also because it allows the driver to occupy a minimum amount of space within the carriage 30. As an alternative, the notches 24 could be omitted so that the bottom surface of barrier 20 would rest on the collars 98 and 99.

To further protect the driver 90 and to improve the performance of the vehicle restraint 10, the driver is releasably coupled to the vertical barrier to allow for independent movement of the barrier relative to the driver. In the present embodiment, this releasable coupling is achieved by means of a driver block 100 being attached to the piston 94 of the driver 90. In turn, this driver block makes a contacting engagement with the interior surface of the vertical barrier 20, as can be seen in FIG. 4, the driver block 100 is attached to the end of piston 94 by means of a pin 101. The releasable contact between the driver 90 and the vertical barrier 20 prevents the driver 90 from being damaged by a sudden upward movement of the vertical barrier 20. Such movement of the vertical barrier could occur, for example, by virtue of someone using the vehicle restraint to step up or down from the loading dock. Since the bias member 65 would be stretched by virtue of that person's weight, the person jumping off the carriage would cause a sudden upward movement of the carriage by means of the bias device. When the carriage reaches its upper limit of travel, however, its upward movement, would abruptly stop, but that of the vertical barrier 20 would not. In such a situation, a permanent connection between vertical barrier 20 and the driver 90 could result in an undue pulling force being exerted on the piston 94 thus damaging the screwdrive 90. By making the connection between the driver 90 and the vertical barrier 20 releasable, such undue damage to the driver is avoided.

The vertical barrier 20 which moves under the influence of driver 90, is guided in its substantially vertical movement by means of guide blocks mounted on the side sections 31 and 32. The guide blocks 110 and 111 are shown mounted to their respective side sections 31 and 32 in FIGS. 3 and 4. In FIG. 5, guide section 110 is shown in its orientation with respect to the vertical barrier 20. As can also be seen from FIG. 5, a spacer block 115 is also disposed between the side sections 31 and 32. Each of the guide blocks 110 and 111, along with the spacer block 115 include surfaces for contacting and guiding the barrier 20 during its substantially vertical movement. Furthermore, as can be seen in FIG. 6, these same surfaces contact the barrier 20 when the barrier is in the extended, vehicle-retaining position. This contact between the spacer block 115 and guide blocks 110, 111 and the vertical barrier 20 prevent transverse movement of the barrier 20 when it is in the operative position. Such transverse movement is undesirable since it could allow the barrier 20 to slope forward. Were this to occur it would be possible for a vehicle to drive away from the dock and defeat the vehicle restraint. Thus, the contact between the spacer block 115 and guide blocks 110, 111 to maintain the substantially vertical position of the barrier 20 forms an important aspect of the present invention. The spacer block 115 and guide blocks 110, 111 thus resist any horizontal forces applied to the barrier 20 by an ICC bar. Such horizontal forces on the barrier 20 actually cause a torque to be placed on the barrier. In reference to FIG. 6, the moment arm of this torque is the distance between the contact B of the ICC bar with the barrier 20, and the contact A of the barrier 20 with the spacer block 115. Because carriage 30 is vertically adjustable to accommodate different ICC bar heights and vehicle float, the moment arm will always have this relatively small size. This is advantageous as compared to vertical barrier restraints which do not account for float, since a less robust structure can be used in this restraint. According to a further feature of the invention, this moment arm is substantially constant although slight variations could be introduced by different shapes of ICC bars. This is due to the fact that a captured ICC bar will always be on the horizontal surface 37. Thus, any horizontal force exerted on the barrier 20 by the ICC bar 20 will always be at substantially the same vertical position B on the barrier 20 regardless of the height of the ICC bar relative to the roadway and the distance between B and the pivot point A is always the same. The constancy of the moment arm is advantageous since varying moment arms do not have to be accounted for in designing this vehicle restraint to withstand a given maximum horizontal force.

The spacer block 115 serves the further purpose of capturing the vertical barrier 20 within the carriage 30. As can be seen most clearly from FIGS. 5 and 6, vertical barrier 20 includes a stop bar or projection 24 from the front surface thereof. This projection 24 is adapted to engage the bottom surface of spacer block 115 if the vehicle barrier 20 moves vertically beyond a certain position. This contact between stop bar or projection 24 and spacer block 115 thus prevents the vertical barrier 20 from leaving the carriage. This prevents the vertical barrier 20 both from being removed without proper tools from out of the carriage, and from ejecting from the carriage in the situation described earlier as an abrupt stop of the carriage assembly 30.

In addition to the components described above which serve to correctly position the carriage with respect to the ICC bar, and to capture a properly positioned ICC bar, the vehicle restraint 10 according to the present invention also includes several features which enhance its safety as well as ease of operation. The vehicle restraint 10 includes a sensor member 120, the operation of which allows a signal to be generated which indicates that a parked vehicle is properly restrained and that loading and unloading can begin. The sensor member 120 which can be seen most clearly in FIG. 3, is mounted within the carriage 30 for reciprocating vertical movement with respect to the carriage. Under the influence of the ICC bar of a parked vehicle, the sensor member 120 moves between an extended position shown in FIG. 5 and a depressed position shown in FIG. 6. In the extended position, an upper surface 122 of the sensor member extends above the horizontal top surface 37 of the carriage 30. In the depressed position, shown in FIG. 6, the upper horizontal surface 122 of the sensor member 120 is disposed between the horizontal top surfaces 37 of the carriage 30. A contact switch, attached to the sensor 120 in a manner to be described below, moves along with the sensor member in its reciprocating vertical motion between the extended and depressed position. Movement of the sensor member 120 to the depressed position under the influence of a properly placed ICC bar moves the contact switch 130 to an operative position whereby movement of the vertical barrier 20 to its operative position will cause the contact switch 130 to close. Since the contact switch 130 is only brought to this operative position if an ICC bar is in the proper position for being restrained by an extended barrier 20, this closing of the contact switch serves as an indication that the vehicle is properly restrained. The contact switch 130 may be connected to associated electronics (not shown) which can generate a visual signal to both dock personnel and to the vehicle driver that the vehicle is properly restrained, and can thus be loaded or unloaded.

Figure 7:
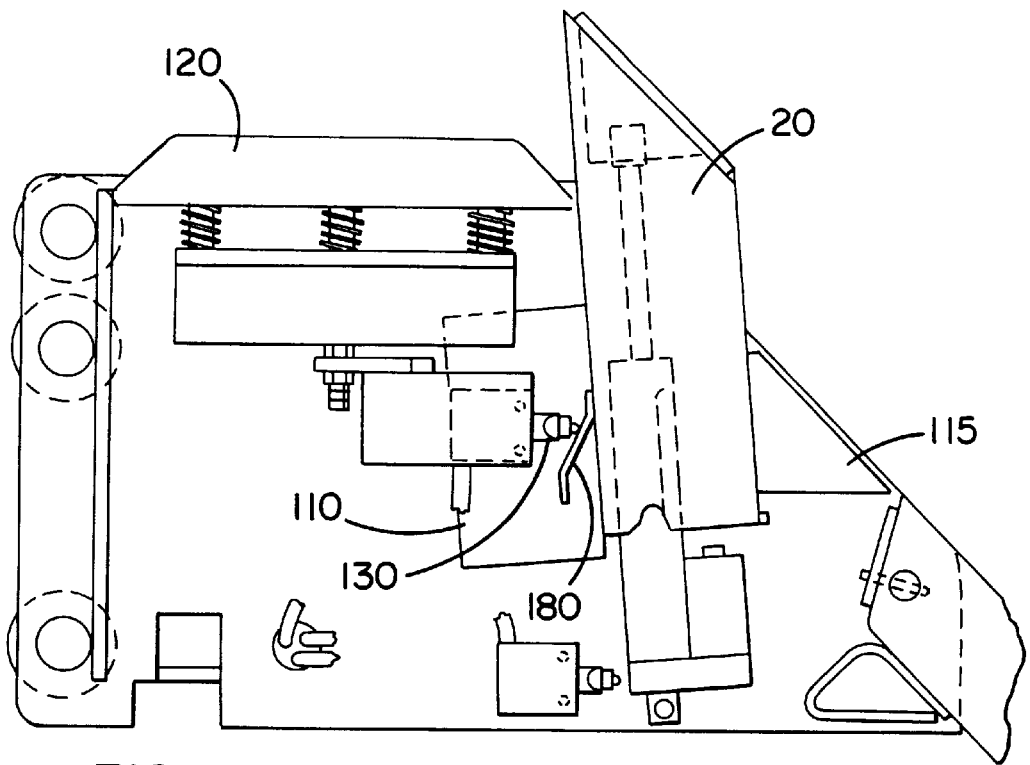
FIG. 7 is a side section view of the vehicle restraint according to the invention showing a first fault condition.
Figure 8:
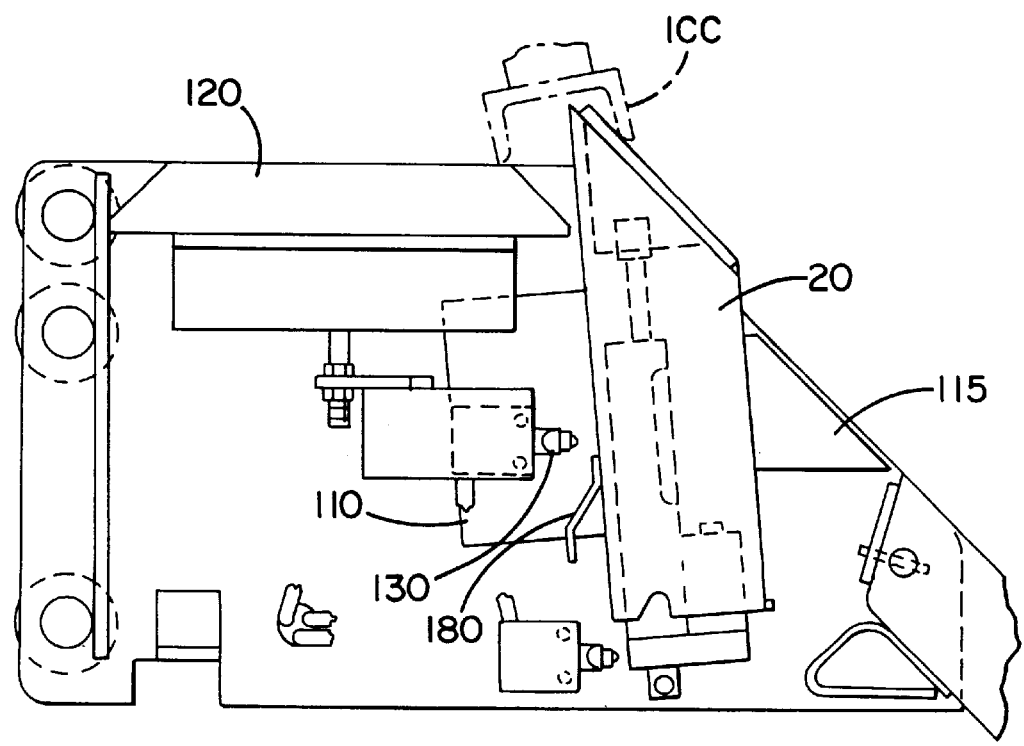
FIG. 8 is a side sectional view of the vehicle restraint according to the invention showing a second fault condition.

Since the contact switch 130 is only closed when both (1) the sensor is depressed by a properly positioned ICC bar, and (2) the vertical barrier 20 is extended to its operative, vehicle engaging position, non-closure of the contact switch 130 can serve as an indication that a vehicle is not properly restrained. Such "fault" conditions are illustrated in FIGS. 7 and 8. In FIG. 7, an ICC bar is not present. As a result, the sensor 120 has not been depressed, and the contact switch 130 is thus not properly positioned in the operative position. Thus, even though vertical barrier 20 is in its extended, vehicle-restraining position, the contact switch 130 is not closed.

In the fault position shown in FIG. 8, the ICC bar is present, but due to its improper positioning, the vertical barrier 20 has been prevented from rising to its fully extended position. Since the sensor 120 is depressed, the contact switch 130 is in the operative position. However, because the barrier 20 is not fully extended, the contact switch has not been closed. In either of these cases, the non-closure of the contact switch prevents the representative signal from being sent to the control electronics. As a result, no visual signal that the vehicle is locked would be displayed, and both the dock personnel and the vehicle driver would be alerted to a fault condition.

The sensor member 120 is biased into the extended position by means of a sensor biasing device, illustrated as compression springs 140 in FIG. 5. The springs 140 are disposed between the sensor member 120 and a post receiving block 150 which is mounted between side panels 31 and 32 of carriage 30. The post receiving block includes three spaced holes which receive posts 160 which extend downwardly from the sensor member 120, as is shown most clearly in FIG. 3. The springs 140 maybe adapted to surround the post 160. Furthermore, sensor member 120 may include recesses 162 for receiving the upper end of the springs 140, as shown in FIG. 3. With the springs 140 in place and the post 160 engaged in the holes in the post-receiving block, sensor member 120 is biased into its extended position. This biasing ensures that the sensor member will only be in its depressed condition and the contact switch 120 will only be in its operative position when a properly positioned ICC bar is in place and depresses the sensor. The compressive strength of the compression springs 140 is substantially less than the force necessary to depress the carriage 30.

The contact switch 130 is connected to one of the downwardly extending posts from the sensor member 120 to ensure that the contact switch 130 vertically reciprocates along with the sensor member 120. As can be seen most clearly seen in FIGS. 3 and 4, the contact switch 130 is mounted to a switch receiving bracket 170 by means of bolts 172. This switch receiving bracket 170 is, in turn, mounted to one of the downwardly-extending posts 160 which is threaded for that purpose. According to this embodiment of the invention the central downwardly extending post is used to attach to the contact switch bracket 170.

The sensor member 120 also includes front and rear sloping portions designated respectively as 123 and 124 (FIG. 5). With the sensor member 20 in the extending position, front sloping surface 123 serves as an effective extension of the front sloping surface of the carriage 30. Thus, as an ICC bar moves up the camming surface 38 it will also contact sloping surface 123 and cam the sensor member 120 downward into the depressed position.

To provide for contact between the vertical barrier 20 and the contact switch 130 when the sensor member is in the depressed position, and the vertical barrier 20 is in the operative vehicle-restraining position, the vertical barrier 20 includes a switch engaging portion in the form of a strip 180 on a rear surface of the barrier. This switch engaging strip 180 is a formed piece of spring steel, and can be most clearly seen in FIG. 3. The switch engaging strip 180 includes an elongated downwardly extending contact portion 182. The shape of the formed spring steel member ensures that the downwardly extending contact portion 182 is biased away from the rear surface of the barrier. The fact that the contact portion 182 is elongated downwardly means that contact with the contact switch 130 can occur over some defined range of vertical motion and over a defined range of horizontal motion. As a result, the biasing of the member 180 away from rear surface of the barrier allows for substantial vertical and horizontal movement between the barrier and the sensor, while still maintaining the contact between the contact portion 182 and the contact switch 130. Such relative vertical and horizontal movement may occur due to external forces including vibration and motion of the restrained vehicle or carriage 30. The structure of the switch engaging strip 180 ensures that such relative vertical and horizontal movement will not cause the switch engaging strip to lose contact with the contact switch and thus generate a fault condition when the vehicle is actually properly restrained.

The vehicle restraint 10 also includes a lower contact switch 190, which can generate an indication that it is safe for the vehicle to pull away from the dock. As can be seen in FIGS. 3 and 4, this lower contact switch 190 is fixed to side section 31. The contact switch 190 is positioned such that it is engaged by the rear surface of the vertical barrier 20 when the vertical barrier is in the inoperative vehicle-release mode. Closure of contact switch 190 thus serves as an indication that the vehicle is no longer being restrained and may be safely driven away from the dock. An electrical signal generated by closure of the switch may be provided to the control electronics (not shown) so that they can provide a visual signal to the vehicle driver that it is safe to leave the dock.

Figure 9:
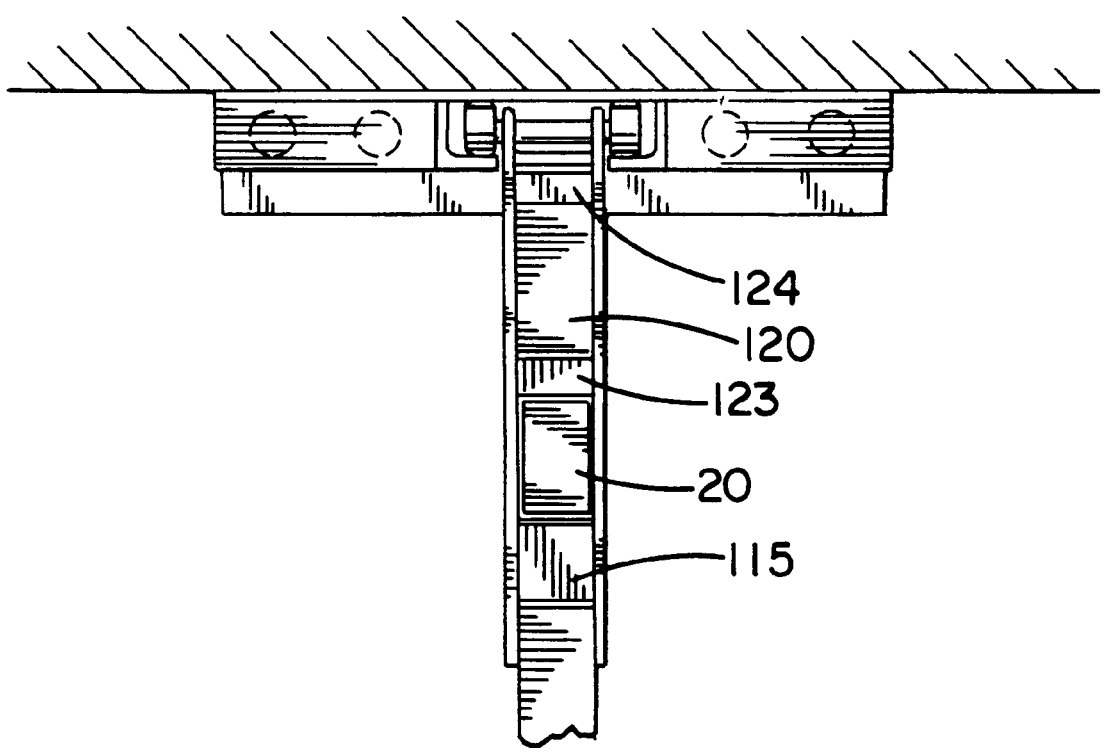
FIG. 9 is a top elevational view of the vehicle restraint according to the invention.

The sensor member 120, along with the barrier 20 and spacer block 115, also protect the carriage interior volume from contamination from above. Referring to FIG. 9, which is a top view of the restraint 10, it can be seen that these three components effectively form a cover for the top of the restraint 10. This is true when the sensor and barrier are in either their extended or depressed positions.

In the embodiment of the vehicle restraint just described, a powered driver 90 was used to move the vertical barrier 20 between its inoperative and operative positions. According to an alternative embodiment of this invention, a non-powered means may be employed for the same purpose. An example of such vehicle restraint can be seen in FIGS. 10 and 11. Although this embodiment of the invention may include all of the signalling features described above, they have been omitted from FIGS. 10 and 11 for ease of reference. Rather, these figures only show the actuation mechanism for movement of the barrier, and the means for retaining the barrier in the inoperative position.

To move the barrier between the inoperative and operative positions, a resilient device is used, according to the present invention the resilient device is an extension spring 200. The spring 200 is disposed on a cylindrical member 205 which serves to guide and retain the spring 200. Like the driver 90 of the previous embodiment, this cylindrical member 205 is secured between the side plates of the carriage 30 by means of a clevis pin 210. As is also true in the previous embodiment, this clevis pin includes cylindrical sleeves which are adapted to fit within the engaging notch 24 of the vertical barrier 20 to prevent its further downward movement. The vertical barrier includes a horizontal plate 220 including a central opening 222 for receiving the cylindrical member 205. Spring 200 releasably engages the bottom surface of this horizontal plate 220 for exerting an upward force on the barrier member 20 to move it to is operative vehicle-engaging position.

To maintain the vertical barrier 20 in its inoperative position and to maintain the spring 200 in its compressed condition, a latch mechanism 230 is employed. The latch mechanism is coupled to the vertical barrier 20 by means of a suitable cable 240. This cable is strung over a series of pulleys 241, 242 and 243 such that vertical movement of the latch results in substantially vertical movement of the vertical barrier 20. The latch itself is a hooked shaped member 232. In the latched position shown in FIG. 9, that hook member 232 is engaged over a vertical wall 233 in the carriage 30. Extending upwardly from the hook shaped member 232 is a metal eye 235. The metal eye 235 is adapted to be engaged by a lifting handle 250 for the purpose of unlatching the latch mechanism 230 and allowing the vertical barrier 20 to move to its operative, vehicle-restraining position.

Figure 10:
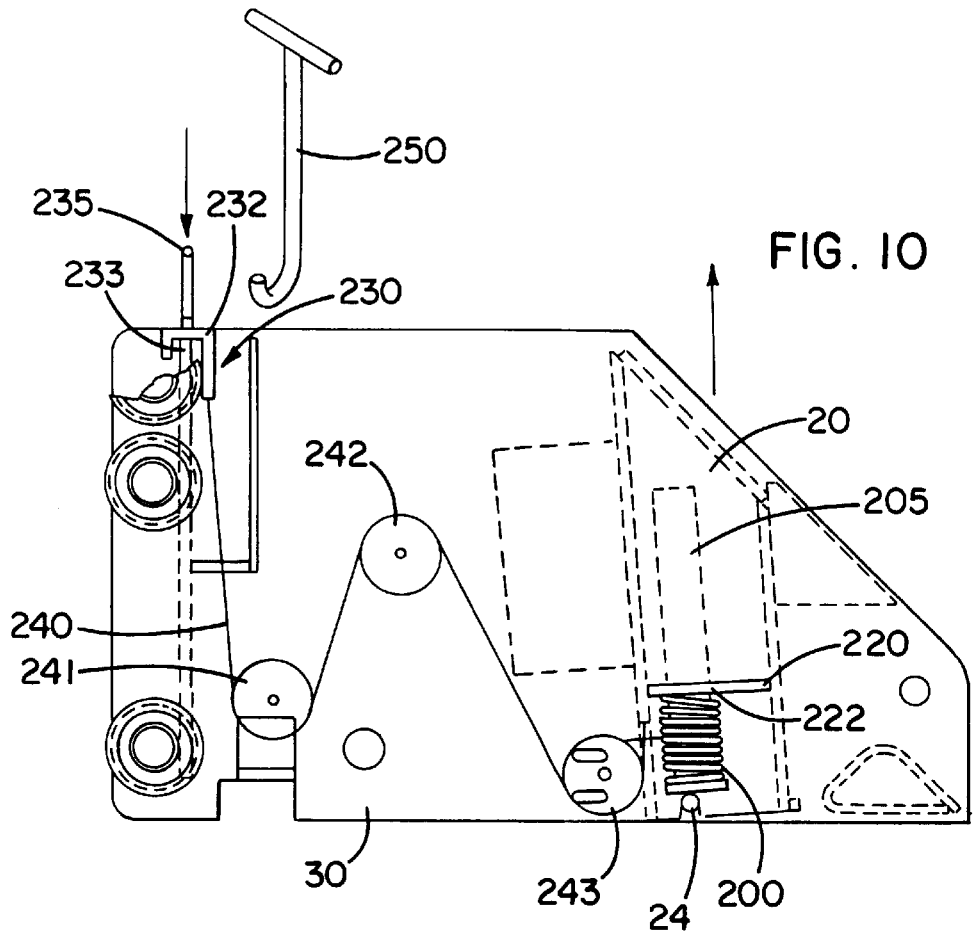
FIG. 10 is a side sectional view of a manual version of the vehicle restraint according to the invention in the inoperative position.
Figure 11:
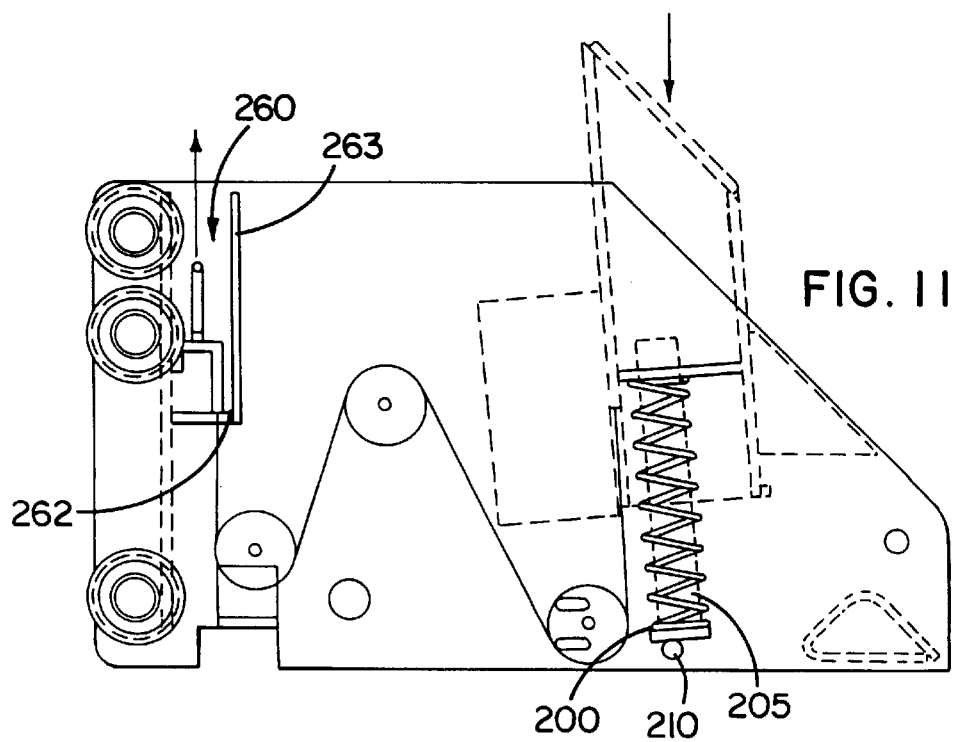
FIG. 11 is a side sectional view of a manual version of the vehicle restraint according to the invention in the operative position.

To achieve unlatching, the hook member 232 is manually moved upwardly and to the right, in the sense of FIG. 10. With the latch member 232 positioned to the right of retaining wall 233, the latch can now move downward vertically into the guide channel 260 formed by horizontal plate 262 and vertical plate 263. As the latch 232 is moved downwardly, the spring 200 exerts an upward force on the vertical barrier 20 thus moving it toward the operative position.

To move the vertical barrier to the inoperative from the operative position, and to secure it in place, the lifting handle 250 is again used to engage the eye 235. The hook member 232 is thus moved upwardly within guide channel 260 until the hook member 232 can be engaged with retaining wall 233 thus latching the vertical barrier 20 into its inoperative position.

There is thus provided both a powered and non-powered embodiment of the vehicle restraint according to the present invention. The vehicle restrain includes an independently moveable carriage and employs a simplified vehicle restraining member which is housed within that carriage. Further, the driver for moving the vehicle restraining member, in both embodiments is simple in construction and does not occupy an undue amount of space inside the carriage. Furthermore, by virtue of the fact that the driver is releasably engaged to the vertical barrier, the drive is less susceptible to damage from uncontrolled carriage movement, or from a force exerted on the vehicle restraining member from efforts to move the restrained vehicle. The vehicle restraint is simple in construction and includes advantageous safety and signalling features.

What is claimed is:

1. A method of detecting when a vehicle having a vehicle bar has been secured to a loading dock with a vehicle restraint having a carriage and a barrier, the vehicle restraint being coupled to the loading dock, the method comprising the steps of:

moving the vehicle toward the loading dock;

moving a switch in at least a vertical direction to an operative switch position in response to contact between the vehicle and the carriage to indicate that the vehicle bar of the vehicle is adjacent to a top surface of the carriage;

moving the barrier of the vehicle restraint into an operative, vehicle restraining, position wherein at least a portion of the barrier extends above the top surface of the carriage and in front of the vehicle bar to secure the vehicle to the loading dock; and operatively engaging the switch with the barrier to change an electrical state of the switch when the switch is in the operative switch position and the barrier of the vehicle restraint is in the operative, vehicle restraining, position.

2. The method of claim 1, further comprising the step of:
generating a signal indicating that the vehicle is secured to the loading dock.

3. The method of claim 1, wherein the step of moving a switch in at least a vertical direction to an operative switch position in response to contact between the vehicle and the carriage to sense when the vehicle bar of the vehicle is adjacent to a top surface of the carriage further comprises moving a sensor member mounted for reciprocal movement with respect to the top surface of the carriage into a depressed position in response to engagement with the vehicle.

4. The method of claim 3, wherein the switch moves into the operative switch position when the sensor member moves into the depressed position and the electrical state of the switch changes when the barrier moves into the operative, vehicle restraining, position.

5. The method of claim 4, further comprising the step of:
generating a signal indicating that the vehicle is secured to the loading dock in response to the change in the electrical state of the switch.

* * * * *